United States Patent [19]
Jorgensen

[11] 3,805,992
[45] Apr. 23, 1974

[54] SHEAR STUD VESSEL CLOSURES
[75] Inventor: Svend M. Jorgensen, Tenafly, N.J.
[73] Assignee: Foster Wheeler Corporation, Livingston, N.J.
[22] Filed: Oct. 13, 1971
[21] Appl. No.: 188,782

[52] U.S. Cl............ 220/46 R, 220/46 MS, 220/55 A
[51] Int. Cl............................................. B65d 53/00
[58] Field of Search............ 220/46 R, 46 MS, 55 A

[56] References Cited
UNITED STATES PATENTS

| | | | |
|---|---|---|---|
| 2,424,449 | 7/1947 | Gasche | 220/46 MS |
| 2,649,988 | 8/1953 | Campbell | 220/46 R |
| 2,903,152 | 9/1959 | Kuo | 220/46 MS |
| 3,159,302 | 12/1964 | Latham et al. | 220/46 MS |
| 3,451,585 | 6/1969 | Jorgensen | 220/46 R |

FOREIGN PATENTS OR APPLICATIONS
193,706  1/1938  Switzerland.................. 220/46 R Primary Examiner—George E. Lowrance
Assistant Examiner—James R. Garrett
Attorney, Agent, or Firm—Marvin A. Naigur, Esq.; John E. Wilson, Esq.

[57]  ABSTRACT

A pressure vessel including an open-ended cylindrical vessel and a plug extending into the open end of the vessel and defining a space of annular transverse cross-section therewith. One or more sealing rings are disposed in the said space and are compressed by means of a plurality of spaced studs disposed around the space and threadably engaging the vessel and the plug.

7 Claims, 5 Drawing Figures

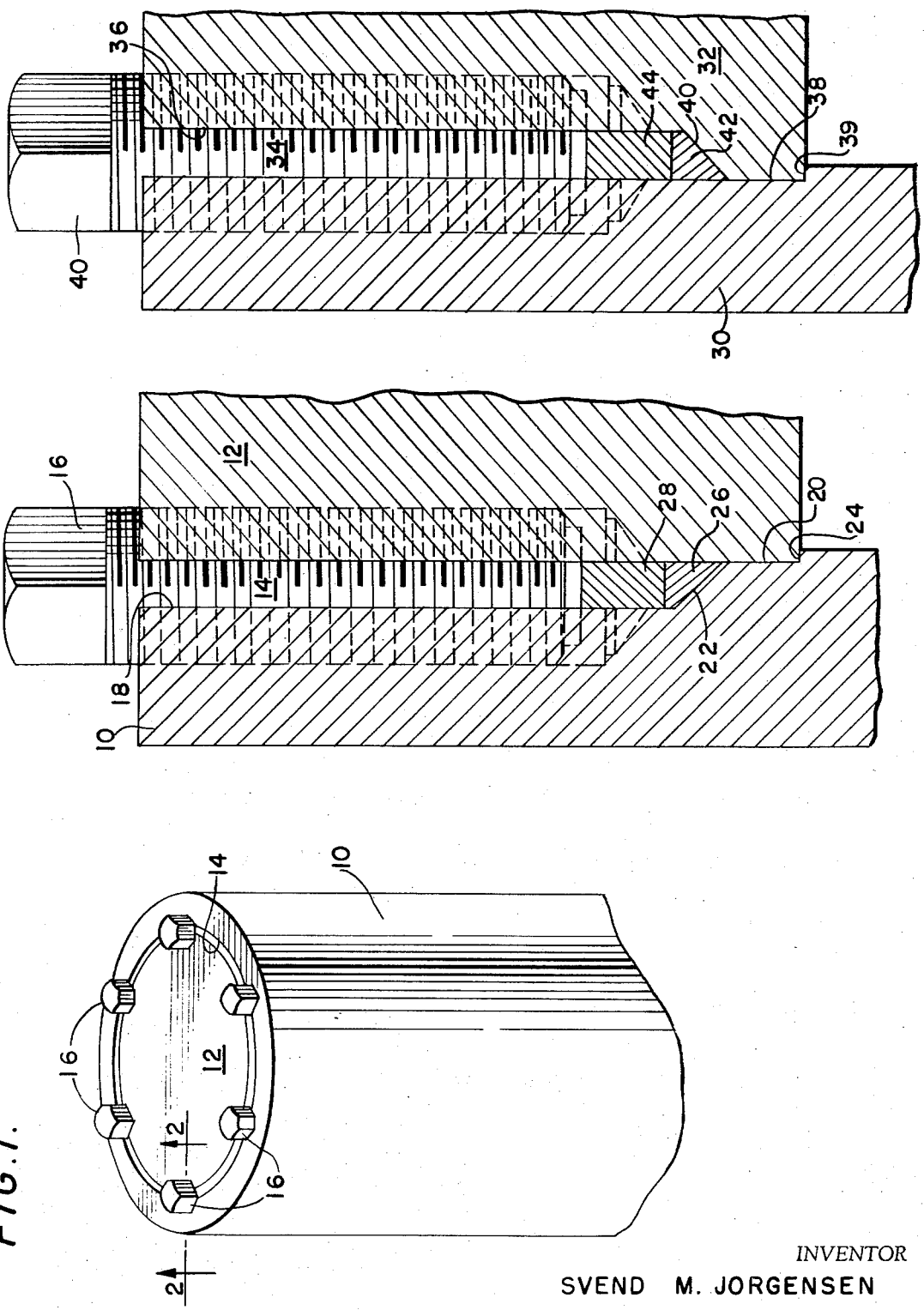
INVENTOR
SVEND M. JORGENSEN

*INVENTOR*
SVEND M. JORGENSEN

SHEAR STUD VESSEL CLOSURES

BACKGROUND OF THE INVENTION

This invention relates to a fluid container, such as a pressure vessel, and more particularly to a pressure vessel in which two adjoining vessel components are fixed together in an improved manner.

In process plants and other environments which requires high pressure vessels, many of these vessels, such as reactors, converters, etc., require full size end openings having closures which are removable to permit insertion and withdrawal of external material, equipment, etc. Also, these vessels are often of a size and weight which require them to be constructed of two or more shell members.

Several proposals have been made to connect the closures to the vessels and the shell members to each other. One of the most conventional arrangements utilizes a bolted flange unit with stud bolts attached to a flange at the end of a vessel shell. However, the disadvantages of these type arrangements are numerous. For example, the cost is disproportionally large compared with the total vessel cost, the handling of these units require special equipment, and the size of the complete vessel is unmanageable. Furthermore, the assembling and disassembling of the units is cumbersome and time consuming, as well as being impractical and uneconomical beyond certain limits of size and/or pressure.

Shear block and breech designs have also been suggested, but their use is restricted, due to high rotary and bending moments which occur with respect to a groove which is machined in a counterbore formed in one of the units.

SUMMARY OF THE INVENTION

It is therefore an object of the present invention to provide a pressure vessel in which two adjoining vessel components may be quickly assembled and disassembled.

It is a further object of the present invention to provide a pressure vessel of the above type which is relatively inexpensive in manufacturing and assembly costs.

Towards the fulfillment of these and other objects, the container of the present invention comprises a first container member having an open end, a second container member having at least a portion thereof extending into said open end, said container members defining a space of annular transverse cross-section extending from said open end to a point intermediate the ends of said first container member, at least one sealing member having a cross-sectional width less then the cross-sectional width of said space and extending in a portion of said space in engagement with each of said container members, and means bridging said space for connecting said members and compressing said sealing member.

BRIEF DESCRIPTION OF THE DRAWINGS

Reference is now made to the accompanying drawings for a better understanding of the nature and objects of the present invention. The drawings illustrate the best mode presently contemplated for carrying out the objects of the invention and are not to be construed as restrictions or limitations on its scope. In the drawings:

FIG. 1 is a partial perspective view of the pressure vessel of the present invention;

FIG. 2 is an enlarged cross-sectional view taken along the line 2—2 of FIG. 1; and, FIGS. 3–5 are views similar to FIG. 2, with each depicting an alternate embodiment of the present invention.

DESCRIPTION OF THE PREFERRED EMBODIMENTS

Figure 4:
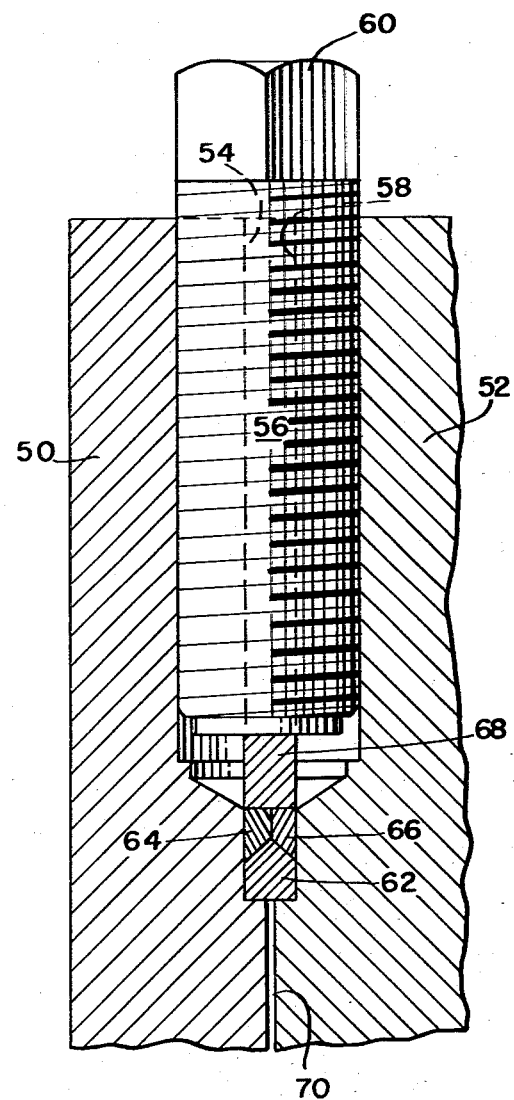

Referring specifically to the embodiment of FIGS. 1 and 2 of the drawings, the reference numeral 10 refers to an open-ended cylindrical vessel having a closure plug 12 extending in the open end and flush therewith. The outer diameter of the plug 12 is less than the corresponding inner wall portion of the vessel 10 to define a space of annular transverse cross-section 14. A plurality of threaded shear studs 16 are disposed in a spaced relationship around the space 14 in engagement with the vessel 10 and the plug 12.

As shown in FIG. 2, the inner wall of the vessel 10 is machined to form two cylindrical counterbores 18 and 20, the counterbore 18 extending from the open end of the vessel to a point intermediate its axial length, and the counterbore 20 extending from the bottom of the counterbore 18 for an additional axial length. The diameter of the counterbore 20 is slightly less than the diameter of the counterbore 18 and is provided in a stepped relationship thereto by means of a tapered shoulder 22, with a shoulder 24 forming the lower boundary of the counterbore 20. As is apparent from FIG. 2, the annular space 14 is defined between the outer diameter of the plug 12 and the wall of the counterbore 18.

The threaded shear studs 16 are disposed in a corresponding number of circularly spaced tapped bores spaced around the space 14. Each tapped bore is defined by both the vessel 10 and the plug 12 and extends across the space 14. Each stud 16 has a head portion extending outwardly from the ends of the vessel 10 and the plug 12, and a flattened end opposite the head portion.

A wedge-shaped gasket ring 26 is disposed in the space 14, with the tapered portion of the ring resting on the tapered shoulder 22. A follower ring 28 extends over the gasket ring 26 with an outer peripheral surface of each of the rings engaging the cylindrical bore 18 and the other surface of the plug 12.

The above arrangement thus permits the plug 12 to be initially placed inside the open end of the vessel 10 with the bottom end of the plug engaging the shoulder 24 to locate the plug in an axial position relative to the vessel. Then the gasket ring 26 and the follower ring 28 can be precisely positioned in the space 14. After this, each individual shear stud 16 can be threaded into its respective tapped bore, and its axial position adjusted to control the compression of the rings 26 and 28. As stated earlier, this unique method of assembly minimizes the precise machining required and makes it possible to install the rings 26 and 28 in line with the shear studs 16 while avoiding any excentric bending movements when the shear studs are rotated to compress the sealing rings. Since the center section of each shear stud 16 is its weakest area, the fact that a gap 14 exists between the outer surface of the plug 12 and the cylindrical counterbore 18 in the vessel 10 is of no consequence, since the shear area of each shear stud does not materially decrease. According to a preferred embodiment, the width of the gap 14 should be designed so that it is between one fourth and one third the diameter of the shear studs.

It is noted that after the components have been assembled in the above manner, a great majority of the hydrostatic load in the vessel 10 caused by the internal fluid pressure therein is taken up by the plug 12 which in turn transmits the load to the wall of the vessel 10 via the shear studs 16.

Figure 5:
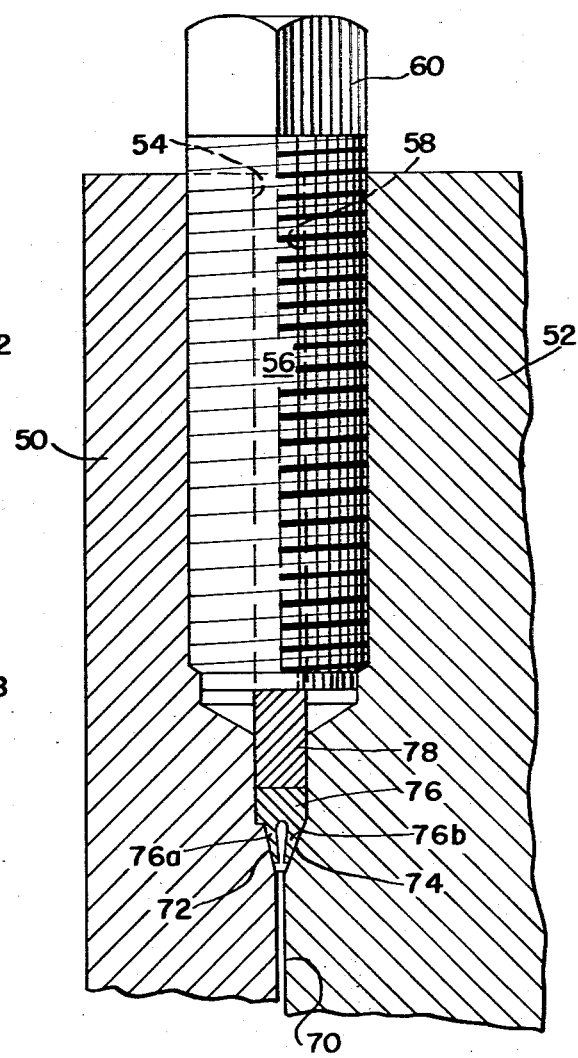

Each of the embodiments of FIGS. 3–5 incorporates the advantages of the embodiment of FIGS. 1–2, but features other designs of the vessel member, the plug member, and the sealing rings.

In particular, the embodiment of FIG. 3 is similar to the previous embodiment but disposes the sealing rings in a slightly different manner. In accordance with this design, a cylindrical vessel 30 is provided with a cylindrical plug 32 disposed in its open end as in the previous embodiment. An space 34 is provided between the outer surface of a notched end portion 36 of the plug 32, and a cylindrical counterbore 38 is formed in the end portion of the vessel 30 and terminates at a shoulder 39. A plurality of spaced shear studs 40 are spaced around the space 34 and each extends across the space in engagement with the vessel 30 and the plug 32.

The notched portion 36 of the plug 32 is bottomed by a tapered shoulder 40, and a gasket ring 42 and a follower ring 44 are disposed in the space 34, with the gasket ring being wedge shaped and resting on the tapered shoulder. A peripheral surface of both of the rings 42 and 44 engages the inner walls of the notched portion 36 and the counterbore 38.

It is apparent that the embodiment of FIG. 3 enjoys the advantages of the embodiment of FIGS. 1 and 2, since, for example, the plug 32 can be placed in the open end of the vessel 30 before the rings 42 and 44 are inserted in the space 34.

According to the embodiment of FIG. 4, a vessel 50 is provided which is adapted to receive a cylindrical plug 52 in its open end, as in the previous embodiments. A cylindrical counterbore 54 is formed in the open end portion of the vessel 50 and defines a space of annular transverse cross-section 56 with a corresponding notch 58 formed on the outer surface of the upper end portion of the plug 52. A plurality of shear studs 60 are spaced around the space 56 and each extends across the space in engagement with the vessel 50 and the plug 52.

A floating ring 62 rests on the shoulders formed at the bottoms of the counterbore 54 and the notch 58, and receives two sealing rings 64 and 66 which are pressed downwardly towards the floating ring 60 by means of a back-up ring 68 in engagement with the flat end portions of the shear studs 60.

The upper portion of the floating ring 62 is symmetrically tapered, with each of the sealing rings 64 and 66 being wedge shaped in engagement therewith, so that the back-up ring 68 distributes the axial pressure provided by the shear studs 60 uniformly over the sealing rings 64 and 66 to uniformly compress them against the floating ring 62. A portion of the periphery of the rings 62, 64 and 66 engages the counterbore 54 and the notch 58 and provides a seal between the vessel 50 and the plug 52. It is noted that a small annular space 70 exists between the inner wall of the vessel 50 and the outer surface of the plug 52. As a result, the floating ring 62 receives a small portion of the hydrostatic load which acts in an axial direction opposite to the direction of the axial pressure provided by the shear studs 60, and thus further compresses the rings 62, 64, 66, and 68.

In the embodiment of FIG. 5, the various components are substantially identical to the components of the embodiment of FIG. 4 and are therefore given identical reference numerals and will not be described in any further detail. However, in the embodiment of FIG. 5, the bottom portions of the counterbore 54 and the notch 58 are tapered as shown by the reference numerals 72 and 74, respectively, and a sealing ring 76 having a pair of tapered legs 76a and 76b is provided in the space 56 with the legs engaging the tapered portions 72 and 74. Also, a back-up ring 78 is provided which distributes the pressure from the shear studs 60 uniformly across the sealing ring 76 in a similar manner as the ring 68 of the embodiment of FIG. 4.

In the embodiments of FIGS. 4 and 5, it is understood that means are provided to locate the plugs 52 in an axial direction relative to the vessels 50.

It can be appreciated that the embodiments of FIGS. 4 and 5 enjoy the same features of the previous embodiments including the advantages of assembly as disclosed above.

It is understood that the features of the present invention can also be applied to other embodiments, such as a joint between two shell portions which together form a cylindrical type vessel or the like, and that variations can be made in the foregoing without departing from the scope of the invention. For example, the width of the annular space between the closure plug and the vessel wall can vary from that shown in the drawings within certain limits, while still maintaining the features noted above.

Of course, other variations in the specific construction and arrangement of the embodiments disclosed above can be made by those skilled in the art without departing from the scope of the invention as defined in the appended claims.

I claim:

1. A fluid container comprising a hollow cylindrical member having an open end, a solid cylindrical plug member having at least a portion thereof extending into said open end, said members defining a space of annular transverse cross-section extending from said open end to a point between the ends of said cylindrical member, at least one of said members forming a seat located at the axially inner end of said space, at least one annular sealing member disposed in said space and resting on said seat, the outer surface of the space defining portion of said plug member and the inner surface of the space defining portion of said cylindrical member having a plurality of spaced, longitudinally extending threaded grooves, and a plurality of threaded shear studs spaced around said space and arranged to exert a compressive force on said sealing member, each of said studs having a portion threadably engaging a groove formed in said outer surface of said plug member, a portion extending across said space and a portion threadably engaging a corresponding groove formed in said inner surface of said cylindrical member, the width of said space being greater than one fourth the diameter of each of said shear studs.

2. The container of claim 1 wherein said container members further define an additional space having a tapered radial cross-sectional shape and registering with said first space, and wherein at least one sealing member has a cross-sectional shape corresponding to said tapered cross-sectional shape and extends in said additional space.

3. The container of claim 1 wherein said first container member is in the form of a pressure vessel, and said second container member is in the form of a closure plug for said vessel.

4. The container of claim 1 wherein said shear studs are adapted to transmit the internal fluid pressure acting on said second container member to the walls of said first container member.

5. The container of claim 1 wherein said sealing member includes a sealing ring, and further comprising a back-up ring engaging said shear studs and adapted to transmit the pressure from said studs uniformly over said sealing ring.

6. The container of claim 1 wherein said space is defined by a counterbore formed in the wall of said first container member and the outer surface of said second container member.

7. The container of claim 1 wherein said space is defined by a counterbore formed in the wall of said first container member and a circumferential notch formed in the outer surface of said second container member.

* * * * *